United States Patent Office 3,425,803
Patented Feb. 4, 1969

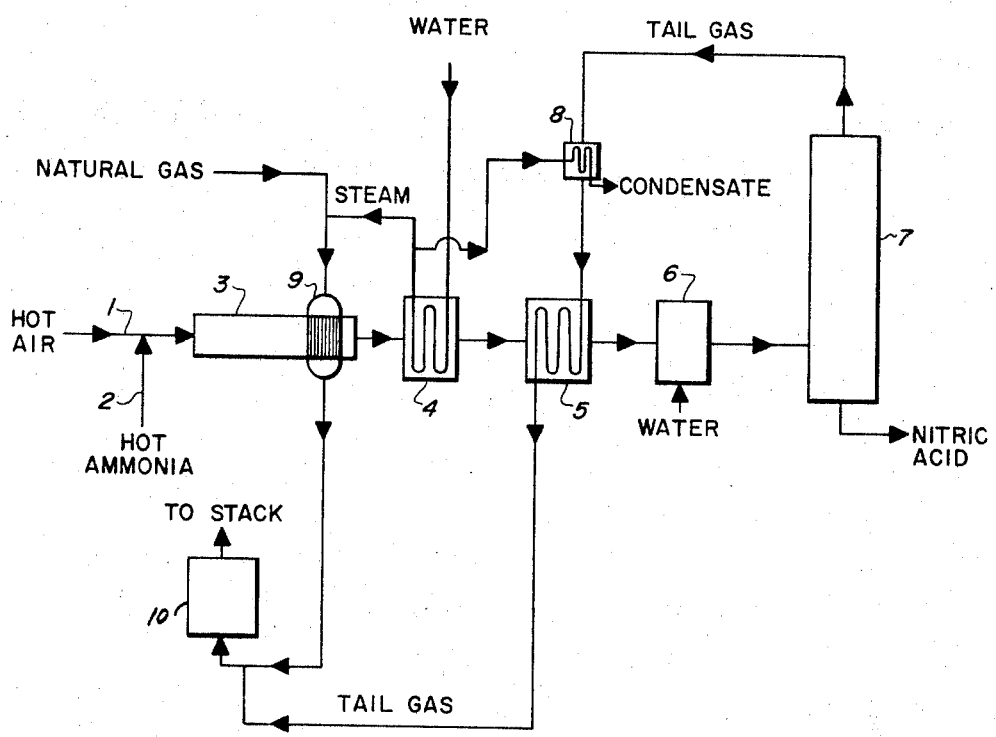

3,425,803
NITRIC ACID TAIL GAS PURIFICATION
Philip L. Romeo, Sr., Englishtown, N.J., assignor to Engelhard Industries, Inc., Newark, N.J., a corporation of Delaware
Filed Sept. 1, 1967, Ser. No. 664,975
U.S. Cl. 23—162
Int. Cl. C01b 2/30, 21/26; B01d 47/00
6 Claims

ABSTRACT OF THE DISCLOSURE

Off gases from nitric acid plants are purified by admixture with natural gas which has first been converted to $H_2$ and CO. The natural gas is admixed with steam and is passed into a reformer which derives its heat energy from the converter synthesizing oxides of nitrogen from ammonia. The process requires less preheating of tail gas and lengthens catalyst life.

BACKGROUND OF THE INVENTION

The purification of tail or off gases from nitric acid plants is well known. The off gases containing oxides of nitrogen, such as NO and $NO_2$, are treated with various fuels in an effort to decolorize and render innocuous the gases passing into the atmosphere. Some of the fuels disclosed for such use include hydrocarbons such as methane or natural gas, hydrogen, ammonia and others. Natural gas is generally used because of its availability, low cost, and effectiveness.

The purification of the tail gases takes place in a catalytic gas burner, usually one containing palladium as catalyst. The tail gas is preheated to 900° F. and mixed with the natural gas to effect the purification.

Because of the constantly increasing demands of air pollution laws and nitric acid manufacturers, the use of a single catalytic burner for decolorization using natural gas has become less acceptable. Newer designs require the use of two catalytic tail gas burners.

SUMMARY

It has now been found according to the present invention that nitric acid tail gas purification can be effected by a method which is less expensive and technically superior to known methods. It involves passing of a hydrocarbon fuel, preferably a light hydrocarbon such as naphtha, LPG, or particularly natural gas, and steam available from a waste heat boiler to a reformer. This process converts the hydrocarbon and steam to hydrogen and carbon monoxide. Natural gas, which is the preferred fuel and will be used herein as a representative example, is converted according to the folowing reaction:

$$CH_4 + H_2O \rightarrow 3H_2 + CO$$

The reformer is heated by gases which leave the zone where nitrogen oxide conversion from ammonia takes place. Only one tail gas purifier is necessary according to this invention. Moreover, substantial heat savings are obtained since the fuel need only be preheated to about 300° F.

It is an object of this invention to provide a new and efficient method for utilizing a hydrocarbon fuel in purifying nitric acid plant off gases. It is a further object to provide a nitric acid plant purification system using natural gas which offers process economies and convenience. A still further object is provision of a process which minimizes the cost of reheating equipment and eliminates a second tail gas purifier unit in nitric acid plants. Further objects wll be apparent from the following description of the invention.

BRIEF DESCRIPTION OF THE DRAWING

FIGURE 1 is a flow diagram pointing out the various streams and pieces of equipment with which this invention respecting nitric acid plants is concerned. A preferred process utilizing this invention is performed generally as follows: Hot air from stream 1 and hot ammonia from stream 2 are combined and passed through converter 3 where the ammonia is transformed into nitrogen oxides. The hot stream of oxides of nitrogen then passes into a waste heat boiler 4, a tail gas heater 5 and a cooler-condenser 6. Weak nitric acid from the cooler-condenser 6 and unreacted nitrogen oxides pass into absorber tower 7 where the nitric acid product is separated from the tail gases. The tail gas is heated with steam in preheater 8 and then passes into tail gas heater 5 where it picks up heat from the hot reaction gases.

Water is converted to steam in the waste-heat boiler 4. The steam is then used both to heat the tail gas in preheater 8 and to react with natural gas in reformer 9 to provide hydrogen and carbon monoxide. This gas mixture from reformer 9 is reacted over tail gas purification catalyst 10 with the gases leaving tail gas heater 5, and the tail gas containing the oxides of nitrogen is rendered colorless and innocuous thereby.

DESCRIPTION OF PREFERRED EMBODIMENTS

According to the present invention, steam and a hydrocarbon fuel such as natural gas are fed to a reformer which is contacted and heated by the hot gas leaving the reaction zone of a converter. The steam and natural gas in the reformer undergo conversion to $H_2$ and CO and these reaction products leave the reformer at about 1,500° F. In the converter, reaction takes place between ammonia and air to give oxides of nitrogen, such as NO and $NO_2$. This conversion is effected using noble metal catalyst such as Pt-Rh gauze. The temperature of this gaseous reaction product is generally about 1,650° F.–1,750° F.

After heat exchange with the reformer, the ammonia oxidation product gases are used to produce steam which in turn is used for admixture with the natural gas in the reformer as discussed above. After this nitrogen oxide containing gas undergoes contacting with water, and the product acid is separated, the off or tail gas containing NO, $NO_2$, $N_2O$, $N_2O_4$, $O_2$, $CO_2$, $H_2O$, argon and $N_2$ are preheated to about 300° F. This hot tail gas is then passed into a tail gas purifier using a precious metal catalyst whereby the off gases are rendered colorless and innocuous by reduction. The purification process is preferably conducted with a platinum group metal, e.g., palladium, which is preferably on a unitary ceramic or honeycomb type support.

Some or all of the $H_2$-CO gas mixture at 1,500° F. is intimately combined with the tail gas for passage through the tail gas purifier. The relatively low reaction temperature of about 200°–600° F. and the fact that $H_2$-CO rather than natural gas is burned assists in prolonging the life of the catalyst and the equipment. Total color abatement is achievable even when as much as about 4% by weight of oxygen is present in the tail gas. This represents a distinct advantage over a process using natural gas as the reducing fuel. In such an instance, a concentration of oxygen in the tail gas greater than about 2.4% results in poor decoloration and in incomplete purification. Indeed, upon starting the tail gas purifier in a nitric acid plant arranged according to the present invention, fuel can be added to assist in quickly getting the unit up to operating temperature. This fact plus the fact that less preheating is necessary for the tail gas, permit more rapid purification after start-up and less air pollution.

As previously indicated, the temperature of the tail gas is 200°–600° F., preferably about 300° F., upon entry into the tail gas purifier. Prior art use of natural gas instead of reformer gas required preheating of the tail gas to 900° F. before passage to the purifier. This necessitated use of an additional tail gas preheater unit. A turbine gas heater was ordinarily used for this purpose. The present invention eliminates the need for this turbine gas heater and permits significant equipment savings as a result. Similarly, a steam tail gas preheater heretofore required is no longer always necessary.

The reformer used in the preparation of $H_2$ and CO is of substantially lower capacity than the tail gas purifier previously required. This results in added savings on equipment cost. Moreover, the reformer used need not be one of high efficiency, since any unconverted natural gas may be used as fuel in addition to the $H_2$ and CO. The reformer is preferably catalytic and catalysts such as nickel zirconium silicate and nickel aluminum oxide are particularly effective.

It should be understood that although this invention has been described with reference to particular embodiments thereof, changes and modifications may be made which are within its intended scope, and it should be limited only by the language of the appended claims.

What is claimed is:

1. In a process for preparing nitric acid in which ammonia is converted into oxides of nitrogen over a precious metal catalyst, the oxides of nitrogen are absorbed to form nitric acid, and tail gases from the absorption step are treated in a purified utilizing a precious metal catalyst and a hydrocarbon fuel as a starting material, the improvement which comprises admixing the hydrocarbon fuel with steam in a reformer deriving heat from the ammonia oxidation product gases to convert the hydrocarbon fuel into a gas containing free hydrogen, and passing the tail gas in admixture with said gas containing free hydrogen into a catalytic tail gas purifier.

2. A process according to claim 1 wherein the hydrocarbon fuel is natural gas.

3. A process according to claim 2 wherein the gas containing free hydrogen is at a temperature of 200°–600° F. and comprises substantially $H_2$ and CO.

4. A process according to claim 3 wherein the gas containing free hydrogen is at a temperature of about 300° F.

5. A process according to claim 4 wherein the tail gas purifier contains palladium as catalyst.

6. A process according to claim 5 wherein the tail gas contains less than about 4% oxygen.

References Cited

UNITED STATES PATENTS

| | | | |
|---|---|---|---|
| 2,031,215 | 2/1936 | Hobler | 23—162 |
| 2,970,034 | 1/1961 | Andersen et al. | 23—2 |

OSCAR R. VERTIZ, *Primary Examiner.*

G. O. PETERS, *Assistant Examiner.*

U.S. Cl. X.R.

23—2